United States Patent [19]
Astle

[11] 4,418,591
[45] Dec. 6, 1983

[54] PIPE END PREPARATION AND CUTOFF TOOL

[75] Inventor: William H. Astle, Rancho Cordova, Calif.

[73] Assignee: Tri Tool Inc., Rancho Cordova, Calif.

[21] Appl. No.: 295,368

[22] Filed: Aug. 24, 1981

[51] Int. Cl.³ .............................................. B23B 5/14
[52] U.S. Cl. ........................................ 82/4 C; 30/97; 308/3 A
[58] Field of Search .............. 82/4 C, 4 R, 66; 30/97, 30/96; 308/3 A, DIG. 13; 144/205

[56] References Cited

U.S. PATENT DOCUMENTS

| | | |
|---|---|---|
| 2,747,274 | 5/1956 | Willard et al. ........................... 30/97 |
| 2,796,792 | 6/1957 | Dias . | |
| 2,842,238 | 7/1958 | Shaw et al. ............................... 30/97 |
| 3,688,615 | 9/1972 | Protze et al. ........................... 82/4 C |
| 4,185,525 | 1/1980 | Sherer .................................... 82/4 C |
| 4,213,357 | 7/1980 | Lively et al. .......................... 82/4 C |

*Primary Examiner*—Leonidas Vlachos
*Attorney, Agent, or Firm*—Bacon & Thomas

[57] ABSTRACT

A pipe end preparation and cutoff tool includes a generally annular, fixed housing and a relatively rotatable tool carrying ring that is connected to the housing by means of orthogonal sets of roller bearings travelling in continuous bearing races that are likewise disposed in orthogonal planes. The bearing arrangement enables the ring to transmit radial and thrust loads to the housing and the structural arrangement of elements is intended to prevent gross contamination of the bearing assemblies.

7 Claims, 3 Drawing Figures

PIPE END PREPARATION AND CUTOFF TOOL

BACKGROUND OF THE INVENTION

This invention generally relates to a tool device for performing machining operations on the ends of pipes. Typical machine operations include bevelling, grooving and radially cutting through the pipe wall.

The tool is adapted to fit over a pipe end in concentric relation and includes a rotatable tool carrying ring mounted thereon for moving a tool bit orbitally around the surface of the pipe end area, which is usually held fixed during a machining operation.

The invention more specifically is an improved bearing arrangement for supporting the ring for rotation on the fixed part of the tool.

DESCRIPTION OF THE PRIOR ART

Typical prior art pipe end preparation and cutoff tools use sliding bearing surfaces and radial/thrust ball bearing assemblies between the fixed housing and the rotatable ring sections of the tools. For example, U.S. Pat. No. 1,985,541 shows a representative sliding surface bearing while U.S. Pat. Nos. 3,630,109 and 3,818,786 show representative ball bearing assemblies.

In typical prior art tools, a problem is encountered in precisely locating and supporting the moveable ring so that smooth and true machining operations can be performed at high tool loadings, and in maintaining the ring bearings free of gross contamination such as chips generated during the machining operation. High radial and thrust loads are encountered during machining of thick walled pipe made of stainless steel and other hard materials, and such loads require the use of massive and complicated bearing assemblies to react the loads against the fixed part of the tool housing.

Frequently it is desirable to make pipe end preparation tools highly portable, and therefore the use of massive bearing structures tends to increase weight, tool complexity and cost, while competitive considerations dictate that these factors should be just the reverse; lighter weight, simpler and lower cost.

BRIEF SUMMARY OF THE INVENTION

This invention is an improvement in a pipe end preparation tool, and more specifically in the bearing assembly connecting the rotatable tool carrier ring element of such a tool to the fixed housing part of the tool.

The improvement lies in mounting two sets of circumferentially spaced bearing roller elements located in orthogonal planes on either the ring or the housing of the tool, and using cooperating bearing races in which the rollers travel that are mounted on the adjacent housing or ring of the tool, respectively.

The rollers and races are shielded from the outside area of the tool structure to isolate the bearing rollers and races from gross contamination.

BRIEF DESCRIPTION OF THE DRAWINGS

With reference to the drawings, which show preferred embodiments of the invention.

DETAILED DESCRIPTION OF PREFERRED EMBODIMENTS

Figure 1:
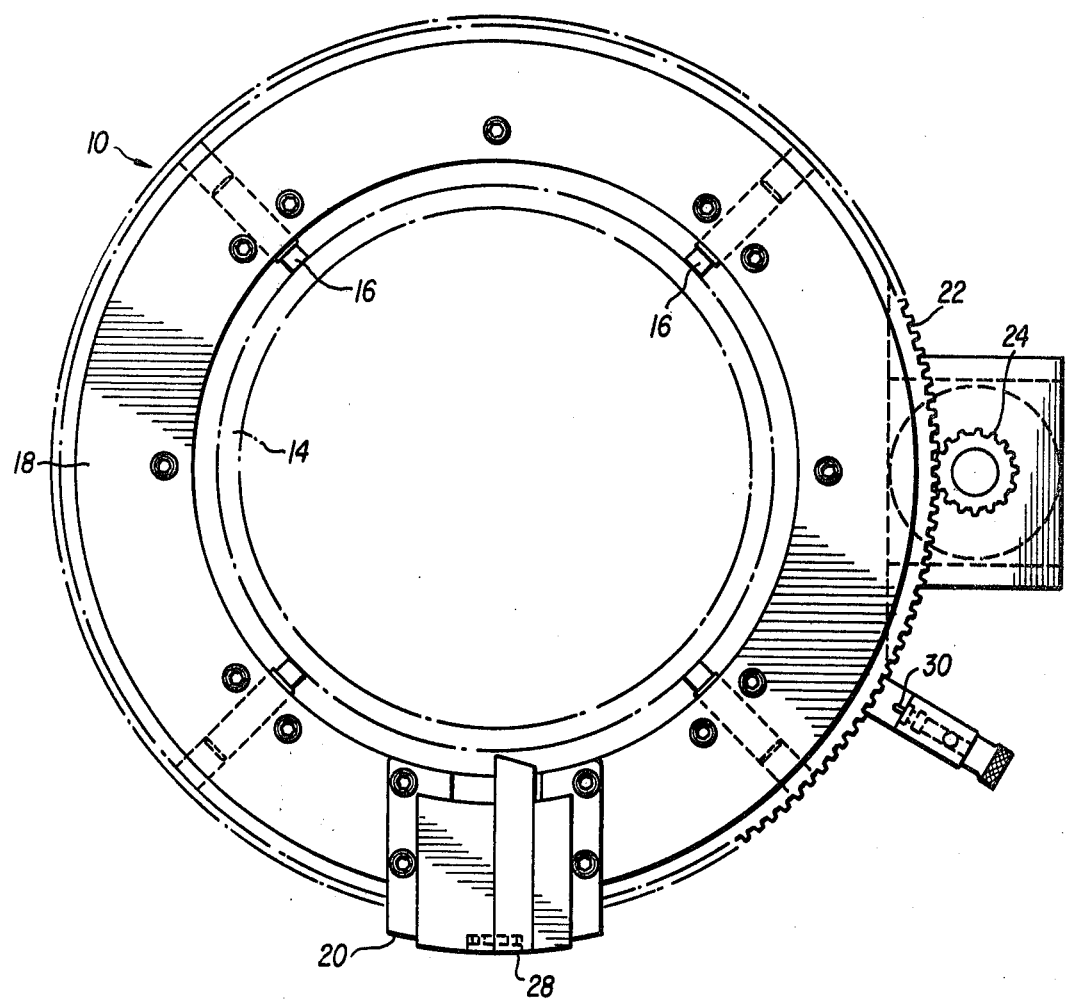
FIG. 1 is a plan view of a pipe end preparation tool embodying the bearing structure according to the present invention.
Figure 2:
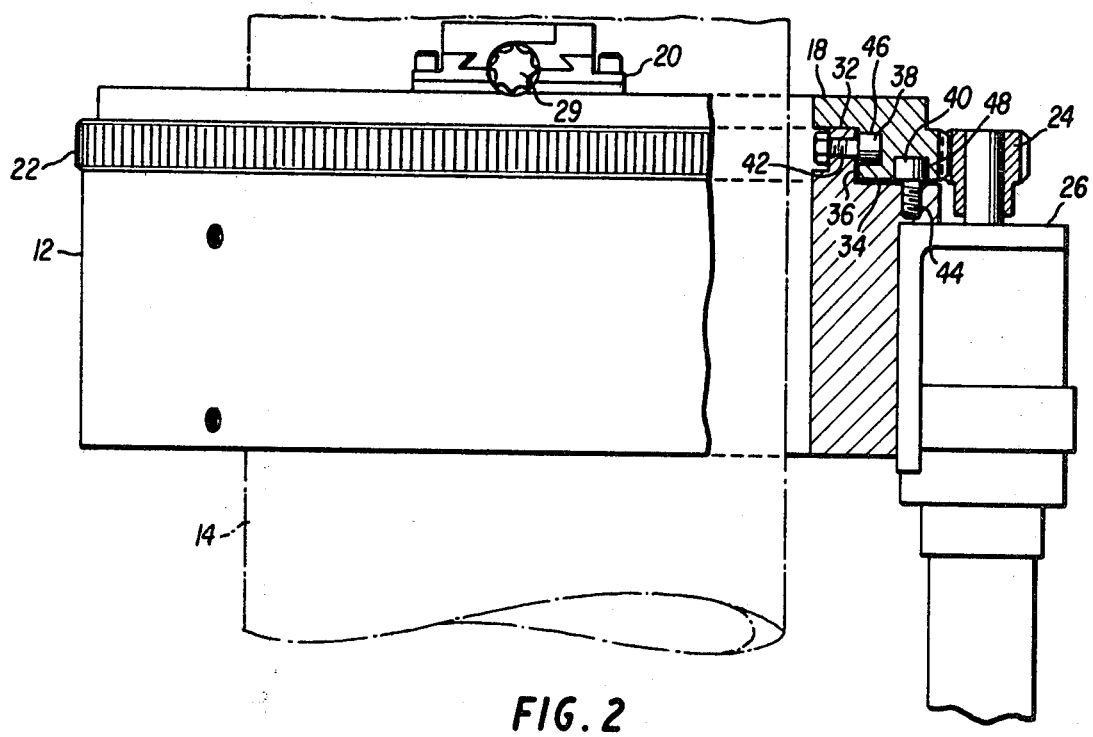
FIG. 2 is an elevational, partial cutaway view of the tool, showing the bearing roller and race details.

With reference to the figures appended hereto, and specifically FIGS. 1 and 2, a pipe end preparation and cutoff tool is generally indicated at 10, the tool including a housing 12 provided with suitable means for engaging the end area of a pipe 14 on which a machining operation is to be performed. For example, adjustable, radially extending grippers 16 can be utilized to secure and center the housing 12 relative to the pipe 14.

The housing 12 is generally annular in shape for accommodating the pipe end and includes a rotatable tool carrier ring member 18 on which is mounted a tool support 20 that is orbitally carried about the pipe end 14 when the ring 18 is rotated relative to the housing 12.

The ring 18 preferably is provided with gear teeth 22 that cooperate with a driving pinion gear 24 that can be driven, for example, by a suitable fluid motor 26 secured to the housing 12.

A suitable tool advancing arrangement is provided to move the tool support 20 towards or away from the surface of the pipe 14 whereby a tool 28 mounted on the tool support 20 can perform a bevelling, grooving or cutoff operation on the end area of the pipe 14.

For example, a conventional star wheel 29 may be utilized in cooperation with a fixed tripper 30 to cause advancement of the tool towards or away from the surface of the pipe 14 when the ring 18 is rotated relative to the housing 12.

The housing 12, as seen in FIG. 2, includes a radial end face 32, an outer radial shoulder 34 and an axially extending interconnecting surface 36 extending between the radial end face 32 and the radial shoulder 34.

The ring 18 is provided with cooperating surfaces that extend parallel with the end face, the radial shoulder and the axial surface 32, 34, 36 of housing 12, thereby essentially shielding the latter surfaces from direct external contamination.

A bearing assembly is utilized to support the ring 18 on the housing 12, such assembly comprising two sets of bearing roller elements 38, 40, each set of rollers lying in planes that are perpendicular or orthogonal with respect to each other, with the rollers furthermore being circumferentially spaced about the ring and housing members. As illustrated in FIG. 2, the rollers are supported in cantilever fashion on fixed studs 42, 44 that are mounted on the housing 12. Each of the rollers is rotatable about its respective stud, but is otherwise fixed against motion with respect to the housing 12.

The rollers 38, 40 respectively engage and cooperate with continuous bearing races 46, 48 that are disposed in the respective oppositely located surfaces of the ring 18 adjacent the rollers 38, 40. The races are likewise disposed in orthogonal planes that extend generally normal to the surfaces 36, 34 of housing 12.

It will thus be seen that the bearing rollers 38, 40 respectively accommodate thrust and radial loads applied to ring 18, and react those loads into the housing 12. By providing a sufficient number of bearing rollers of appropriate size and strength, quite high loadings can be sustained by ring 18 within the limits of its structural strength without imposing high frictional loads between the ring 18 and the housing 12.

Figure 3:
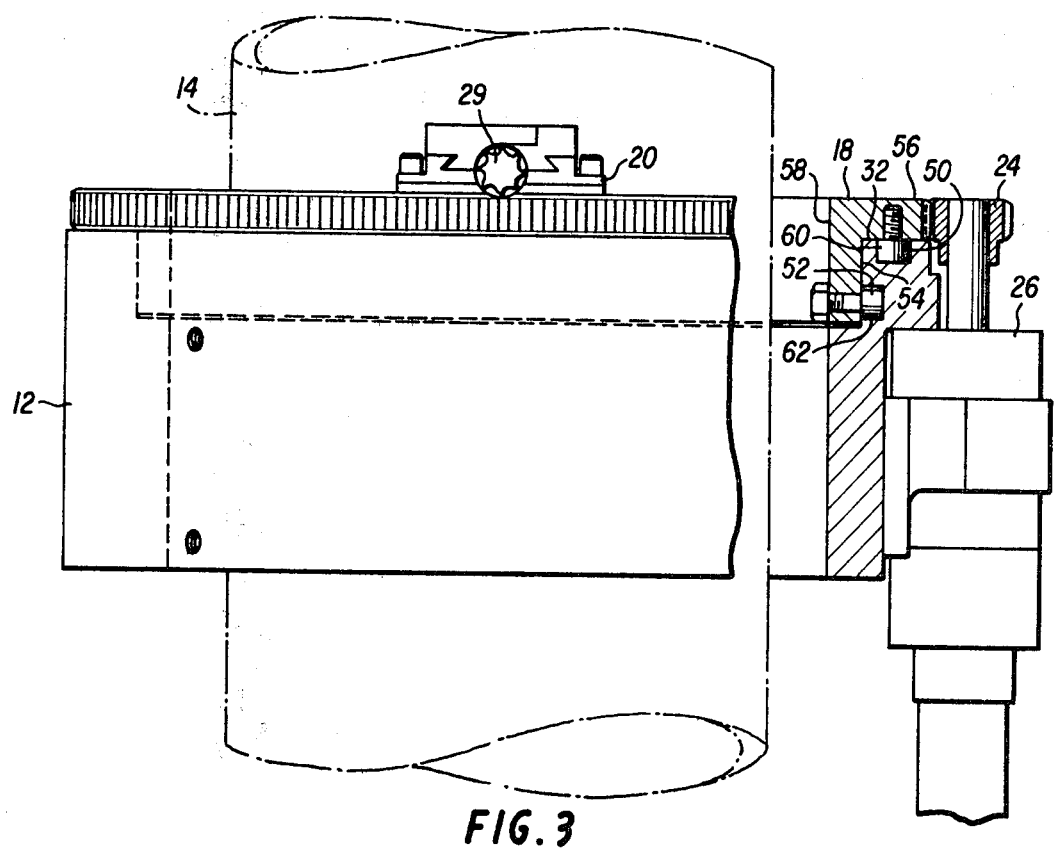
FIG. 3 is a detail view showing an alternate roller and race arrangement constructed according to this invention.

In FIG. 3, an alternate embodiment of the invention is illustrated, and similar reference numerals are used for similar structural parts shown in FIG. 2. In this embodiment, however, the radial end face 32 of housing 12 accommodates one of the bearing races 50, while the opposite bearing race 52 is shown disposed in an axially extending inner surface 54 of housing 12. The ring 18 in this embodiment includes a first portion 56 that overlies the end surface 32 of the housing, and an axially extending annular portion 58 that overlies the axially extending inner surface of the housing 12. It will be noted that the bearing rollers 60, 62 lie in planes that are orthogonal relative to each other whereby radial and thrust loading imposed on ring 18 can be suitably reacted into housing 12.

The foregoing description is considered to be exemplary only to illustrate preferred embodiments of the invention. Various modifications could be made by a person skilled in the art without departing from the scope of the invention, which is defined solely by the claims that follow.

What is claimed is:

1. In a pipe end preparation tool having a tool axis, including a generally annular pipe-engaging support housing member extending along the tool axis, and a tool carrier ring member mounted on the end of the housing member for rotation relative thereto about the tool axis, the improvement comprising, said ring member connected to said housing member by a roller bearing assembly comprising two sets of rollers mounted on one of the members and respectively mounted for rotation about axes located in orthogonal planes, each set of rollers being circumferentially spaced about the ring and housing members, said rollers having peripheral bearing surfaces engaging and cooperating with circumferential bearing races provided on the other member, said races lying generally in the same respective orthogonal planes as said bearing rollers, said bearing surfaces arranged to lie within said bearing races, said bearing races comprising grooves with sidewalls extending parallel with and engageable by said bearing surfaces, whereby radial and thrust loading applied to the ring member can be reacted by the housing member through the bearing surfaces and bearing races.

2. In a pipe end preparation tool, the improvement according to claim 1, wherein the axes of said rollers are fixed relative to the housing member, and said races are provided in the ring member.

3. In a pipe end preparation tool, the improvement according to claim 1, wherein the axes of said rollers are fixed relative to the ring member and said races are provided in the housing member.

4. In a pipe end preparation tool, the improvement according to claim 1, wherein said rollers are cylindrical and include roller surfaces arranged to lie entirely within the bearing races, the bearing races comprising grooves with sidewalls extending parallel with and engageably by the roller surfaces.

5. In a pipe end preparation tool, the improvement according to claim 1, wherein said housing member includes a radial end face, and an axially extending inner surface, said ring member overlying said radial end face and said inner surface, one of said bearing races disposed in said radial end face, and the other of said bearing races disposed in said inner surface.

6. In a pipe end preparation tool, the improvement according to claim 1, wherein said housing member includes a radial end face, an outer radial shoulder surface and an axial cylindrical surface connecting said end face and radial shoulder, said ring member overlying said end face, radial shoulder surface and cylindrical surface of said housing member, said bearing rollers mounted on said radial shoulder and axial cylindrical surfaces; said bearing races disposed in the adjacent overlying ring member.

7. In a pipe end preparation tool, the improvement according to claim 1, wherein said ring member includes outer peripheral gear teeth disposed opposite the portion of said ring member overlying said outer axial surface of said housing member, pinion gear drive means mounted on the housing member, said gear teeth engageable with said pinion gear.

* * * * *